United States Patent [19]

Klingenberg

[11] 4,439,838
[45] Mar. 27, 1984

[54] ONE LINE TEXT DISPLAY WITH TWO INPUT LOCATIONS

[75] Inventor: Wolfgang Klingenberg, Lahstedt, Fed. Rep. of Germany

[73] Assignee: Olympia Werke AG, Wilhelmshaven, Fed. Rep. of Germany

[21] Appl. No.: 286,586

[22] Filed: Jul. 24, 1981

[30] Foreign Application Priority Data

Jul. 26, 1980 [DE] Fed. Rep. of Germany ....... 3028439

[51] Int. Cl.³ .............................................. G06F 3/02
[52] U.S. Cl. ..................................... 364/900; 400/83
[58] Field of Search ... 364/200 MS File, 900 MS File; 400/83

[56] References Cited

U.S. PATENT DOCUMENTS

| 4,193,071 | 3/1980 | Hasegawa | 364/900 X |
| 4,212,077 | 7/1980 | Vitturelli | 364/900 |
| 4,244,031 | 1/1981 | Izushima | 364/900 |

FOREIGN PATENT DOCUMENTS

| 17739 | 10/1980 | European Pat. Off. | 400/83 |
| 2913624 | 10/1980 | Fed. Rep. of Germany | 400/83 |
| 2044969 | 10/1980 | United Kingdom | 400/83 |

Primary Examiner—Raulfe B. Zache
Attorney, Agent, or Firm—Spencer & Frank

[57] ABSTRACT

In a word processor having a keyboard and a display unit for the one-line display of a succession of characters constituting a section of text, the display unit presenting a row of display locations each arranged to display one character, with the display location at the right end of the row constituting a character input location, each character keyed in via the keyboard being first displayed at the input location and then being displayed at successive locations extending along the row to the left of the input location upon the keying in of subsequent characters via the keyboard, the word processor further including a data memory connected for storing the characters keyed in via the keyboard, and a control device for controlling the display of stored text on the display unit, the display unit presents a second character input location to the left of the first-mentioned input location, and the processor is provided with control elements for causing the second location to become the operative input location so that characters keyed in via the keyboard are first displayed at the second location when the characters being displayed on the unit are derived from the data memory.

7 Claims, 4 Drawing Figures

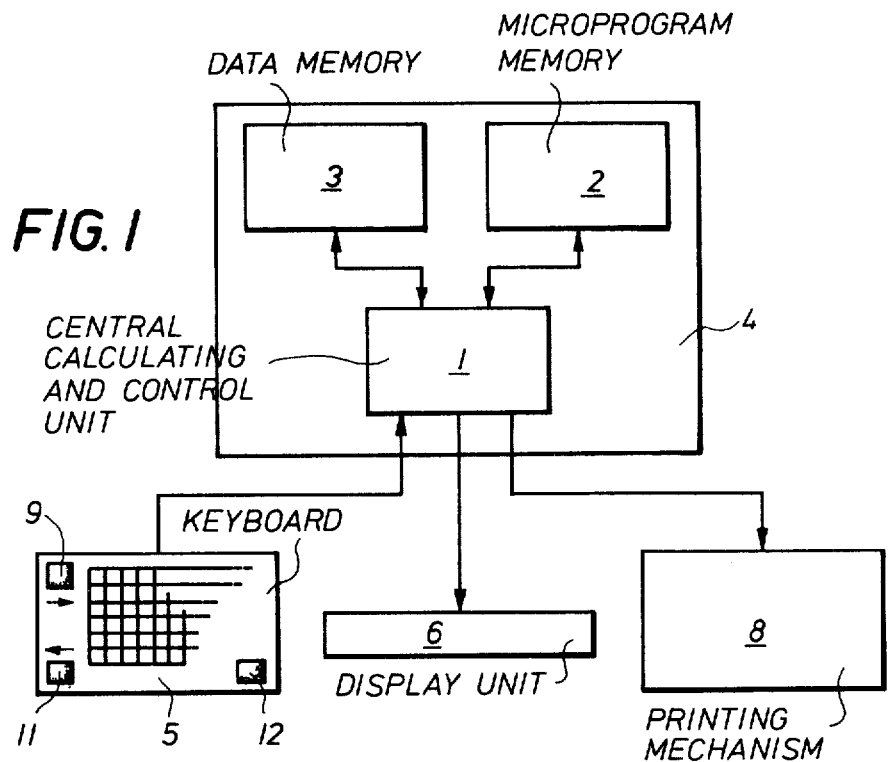
FIG. 1
FIG. 2
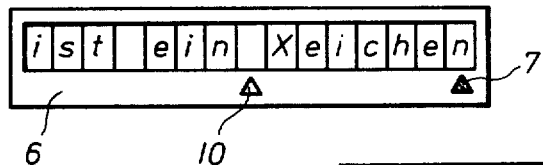
FIG. 3
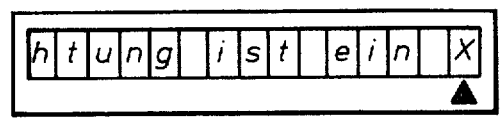
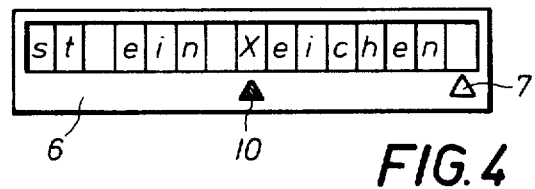
FIG. 4

ONE LINE TEXT DISPLAY WITH TWO INPUT LOCATIONS

BACKGROUND OF THE INVENTION

The present invention relates to a word processor of the type having a display unit for a one-line display of a section of text.

German Offenlegungsschrift [Laid-open Application] No. 2,742,992 discloses a word processor which is provided with a display unit for displaying a section of text. Each text character put in by means of a keyboard is displayed in a character input position disposed on the right-hand side of the display unit and, with each new character input, is shifted to the left by one position so that the last character put in always appears in the extreme right-hand position on the text display region of the display unit and on the total text display region the last 15 characters put in are always visible. This word processor also includes a data memory in which the put-in text is stored, from which it is read out and from which it can be displayed on the display unit in sections each comprising 15 characters.

The display unit serves to give the operator an opportunity to correct errors in a text before printout or to make changes in such a text. Generally, an error is not noted immediately upon input but only after several further characters have been put in. The erroneous character is then no longer in the input position but has been shifted to the left by the number of subsequently put in characters. For the purpose of correction the text must then be shifted to the right until the error character is back in the input position. The operator has available to him special input means for shifting the text and performing the various correction and insertion operations.

There further exists the possibility of calling out a text stored in the data memory and shifting it on the display unit until the character which is to be changed is in the character input position.

However, in both cases the text following the character to be corrected (i.e. the text which had previously been displayed on the display unit to the right of the position to be corrected) is no longer visible to the operator. Correction and changes are therefore very difficult for the operator because they cannot see and control the position to be corrected in context with the text surrounding it and the error often becomes noticeable only if the entire word or at least the next following characters are viewed as well. This drawback produces particular difficulties if part of the text, e.g. a word, is to be inserted or erased. In this case the operator will generally have to make a handwritten note before making the change, because during the correction there will not be available a continuous overview on the display unit.

SUMMARY OF THE INVENTION

It is an object of the present invention to improve the control capability of a word processor with display unit of the above-described type when changes and corrections are to be made in a text being processed.

The above and other objects are achieved, according to the invention, in a word processor having a keyboard and a display unit for the one-line display of a succession of characters constituting a section of text, the display unit presenting a row of display locations each arranged to display one character, with the display location at the right end of the row constituting a character input location, each character keyed in via the keyboard being first displayed at the input location and then being displayed at successive locations extending along the row to the left of the input location upon the keying in of subsequent characters via the keyboard, the word processor further including a data memory connected for storing the characters keyed in via the keyboard, and control means for controlling the display of stored text on the display unit, by constructing the display unit to present a second character input location to the left of the first-mentioned input location, and providing the processor with means for causing the second location to become the operative input location so that characters keyed in via the keyboard are first displayed at the second location when the characters being displayed on the unit are derived from the data memory.

The advantages realized with the invention are mainly that changes and corrections in a put-in text are no longer made only in the last position of the section of text displayed on the display unit but the section of text is displayed in such a manner that the associated portion of the text to the left as well as to the right of the position to be changed or corrected is visible. The operator of the word processor thus has an opportunity to control a continuously readable text including the portion to be changed so that word processing is simplified considerably and the frequency of errors is reduced.

A further advantage of the present invention is that when a text is newly keyed in and when corrections are made in an already stored text the full display capacity of the display unit is utilized.

Further advantageous embodiments of the invention will become evident from the dependent claims as well as from the embodiment to be described below with the aid of the drawing figures.

BRIEF DESCRIPTION OF THE DRAWING

FIG. 1 is a block circuit diagram of a word processor equipped with a display unit according to the invention.

FIGS. 2 through 4 are front elevational views of display units at several different stages in an operating sequence.

DESCRIPTION OF THE PREFERRED EMBODIMENTS

FIG. 1 shows a block circuit diagram of the components of an automatic word processor which are significant for an understanding of the invention. The word processor includes a microprogram controlled machine control 4 containing a central calculating and control unit 1, a microprogram memory 2 and a data memory 3. Data fed in by means of a keyboard 5 provided with alpha-numeric and function keys are processed in a known manner and are printed out by a printing mechanism 8 for display on a record carrier. Additionally, data can be displayed on a display unit 6 after having been converted in a decoding and driver stage which is not shown in detail here.

Text data put in by an operator by means of keyboard 5 are displayed, under control of the central calculating and control unit 1 and the operating program stored in the microprogram memory 2, on the display unit 6. For different modes of operation it may here be provided that the characters overfilling a filled display unit 6 are automatically printed out by the printer 8 or that the characters, in addition to being displayed on the display unit 6, are stored in coded form in the data memory 3 and are printed by the printer 8 only after generation of a special instruction for read-out from the data memory. It is also possible to effect display of the characters on the display unit 6 and to store them in the data memory 3 without printout.

The display unit 6 has the display structure shown in FIG. 2. Each character fed in by the operator by means of the keyboard 5 is displayed on the display unit 6 at a specially identified character input position 7, each character previously fed in being shifted to the left by one position. The display region to the left of the character input position 7 is here filled by the previously put in text portion "ist ein Zeichen" of a text to be stored, the text characters fed in before that portion having been shifted out of the display unit 6 toward the left and no longer being visible. All characters fed in are stored in the data memory 3 and the characters no longer visible on the display unit 6 have possibly already been printed out by the printer 8.

At the moment of the text input shown in FIG. 2, the operator notices that there is an error in the first letter of the word "Zeichen" and that instead of the letter Z, the letter X has been fed in.

According to the prior art, the operator would now have to actuate a shift key 9 on keyboard 5 to shift the text displayed on the display unit 6 to the right until the erroneously printed X is in the input position, as shown in FIG. 3. Since, however, the letters following the erroneous letter are missing from the display, the operator can no longer verify which new word was to be printed with the (erroneous) first letter X and hence what correction is to be made.

According to FIG. 4, the present invention provides a second input position 10 to which the operator can displace the incorrect character X by operating a shift key 11 provided on the keyboard 5 to shift the displayed characters to the left. Actuation of either one of the two shift keys 9 or 11 thus automatically causes character input or correction to take place no longer in the position 7 but instead in the position 10. The respectively applicable character input position can here be marked, for example, by fixed markers on the housing of the display unit, by blinking of the character in the input position, by a marker shown on the display unit itself or in a similar manner. In the illustrated embodiment two arrow-shaped markers are provided in such a manner that the marker designating the presently active input position is illuminated by, for example, a light-emitting diode, so that in FIG. 2, the marker of the character input position 7 would be lit up while in FIG. 4 the marker for the character input position 10 would be lit up.

After shifting the displayed section of text so that the erroneously fed in character is in the character input position 10, the operator is able, in contradistinction to the embodiment of FIG. 3, to make a simple visual verification of what corrective measure to take. After making the correction by replacing the erroneous character with the correct character, a reset key 12 can be actuated to automatically shift the text back into the position shown in FIG. 2 so that the new input of further characters can continue.

Additionally, a further solution would be conceivable in which, instead of providing such a special reset key, the right-hand character input position 7 would always become active after actuation of one of the shift keys 9 or 11 to shift the text so as to bring the last character put in (in the illustrated example the character n) into the right-hand input position, i.e. the text is again in the same position on the display unit 6 as it was before the first shifting took place.

If the operator notices only after reviewing the printed text that the character X has been erroneously keyed in instead of the character Z, there exists the possibility of addressing the error containing text in the data memory 3 by means of a search measure known per se in word processors and to display it on the display unit 6. Here again, one of the shift keys 9 or 11 must be actuated to make the error containing text portion appear on the display unit 6 by shifting the text section as required, this again activating the character input position 10. A correction of the erroneous character is then made in the manner already described.

It is known that typing rhythm and typing habits of individual operators differ so that an input error will be noted by different persons after the input of different numbers of further characters. However, this number of characters is often the same for the same person. It may therefore be advisable for the shift to the left of the character input position for purposes of corrections to be adjustable in magnitude so that each operator can arrange the point of correction as close as possible to that character position in which his experience shows he notes input errors most frequently.

An exemplary, known word processing machine, with a suitable associated display device, which could be programmed to operate in accordance with the present invention is the commercially available memory typewriter Olympia 6020, manufactured by the assignee of the present application. The contents of the microprogram memory of the Olympia 6020 (corresponding to microprogram memory 2 of FIG. 1) would have to be altered in order to implement the invention. A special program routine should provide for checking actuation of one of the shift keys 9 or 11 and displacing the input position from the right-hand position to the left-hand position on the display unit 6 in response. This program routine also would have to check actuation of reset key 12 and replace the input position to the right-hand position 7 in response. A programmer of average skill in the art would be able to make these modifications.

If the input location indicators 7 and 10 should be part of the display unit 6, the display unit of the Olympia 6020 has to be replaced by a display unit with additional display locations, for instance below the character display locations.

It will be understood that the above description of the present invention is susceptible to various modifications, changes and adaptations, and the same are intended to be comprehended within the meaning and range of equivalents of the appended claims.

What is claimed is:

1. In a word processor having a keyboard and a display unit for the one-line display of a succession of characters constituting a section of text, the display unit presenting a row of display locations each arranged to display one character, with the display location at the right end of the row constituting a first character input location, each character keyed in by actuation of the keyboard being normally first displayed at the first input location and then being displayed at successive locations extending along the row to the left of the first input location upon the keying in of subsequent characters by actuation of the keyboard, the word processor further including a data memory connected for storing the characters keyed in via the keyboard, and control means connected to the keyboard, the data memory and the display unit for controlling the display of stored text on the display unit, the improvement wherein a display location of said display unit to the left of said first input location constitutes a second character input location, and said processor includes means operatively associated with said control means for selectively causing said second location to become that input location at which characters keyed by actuation of said keyboard are first displayed when the characters being displayed on said unit are derived from said data memory.

2. Word processor as defined in claim 1, wherein said second character input location is located at the center of said row of display locations.

3. Word processor as defined in claim 1 wherein the number of display locations between said first and second character input locations along said row is adjustable.

4. Word processor as defined in claim 1 or 2 wherein said means for causing comprises input means installed in said keyboard and connected to be manually actuated and operatively associated with said control means for shifting characters in said display unit from one location to the next, and said means for causing said second location to become that input location at which each character keyed in by operation of said keyboard is first displayed upon actuation of said input means.

5. Word processor as defined in claim 1, 2 or 3 wherein said control means operate to cause said first input location to become that input location at which characters keyed in by operation of said keyboard are first displayed whenever the characters displayed in said display locations have been shifted so that the last character keyed in by operation of said keyboard is at said first input location.

6. Word processor as defined in claim 1, 2 or 3 wherein said keyboard further comprises a reset key operatively associated with said control means and actuatable for causing said first input location to become that input location at which characters keyed in by operation of said keyboard are first displayed.

7. Word processor as defined in claim 1 wherein said means for causing comprise microprogram memory means connected to said control means.

* * * * *